United States Patent
Lee et al.

(10) Patent No.: US 7,808,572 B2
(45) Date of Patent: Oct. 5, 2010

(54) LIQUID CRYSTAL DISPLAY DEVICE INCLUDING HEAT CONDUCTING PADS BETWEEN SHIELD COVER AND INVERTER IC AND TRANSFORMER

(75) Inventors: Jae-Ho Lee, Gyeongsangbuk-Do (KR); Chang-Ho Lee, Gyeongsangbuk-Dol (KR)

(73) Assignee: LG Display Co., Ltd., Seoul (KR)

( * ) Notice: Subject to any disclaimer, the term of this patent is extended or adjusted under 35 U.S.C. 154(b) by 177 days.

(21) Appl. No.: 12/153,580

(22) Filed: May 21, 2008

(65) Prior Publication Data

US 2008/0291358 A1 Nov. 27, 2008

(30) Foreign Application Priority Data

May 21, 2007 (KR) .................. 10-2007-0049401

(51) Int. Cl.
*G02F 1/133* (2006.01)

(52) U.S. Cl. .............................. 349/58; 349/70; 361/720

(58) Field of Classification Search ........................ None
See application file for complete search history.

(56) References Cited

U.S. PATENT DOCUMENTS

| | | | | |
|---|---|---|---|---|
| 5,060,114 A | * | 10/1991 | Feinberg et al. ............. 361/706 |
| 5,307,236 A | * | 4/1994 | Rio et al. ..................... 361/720 |
| 6,091,199 A | * | 7/2000 | Van Pelt et al. ............... 315/50 |
| 6,096,414 A | * | 8/2000 | Young ......................... 428/220 |
| 6,522,543 B2 | * | 2/2003 | Kurihara et al. ............. 361/704 |
| 7,251,140 B2 | * | 7/2007 | Bae et al. ..................... 361/719 |
| 7,282,842 B2 | * | 10/2007 | Kim et al. ..................... 313/46 |
| 2008/0018626 A1 | * | 1/2008 | Yang et al. .................. 345/204 |
| 2008/0024714 A1 | * | 1/2008 | Park ........................... 349/150 |
| 2008/0180207 A1 | * | 7/2008 | Park ........................ 336/84 R |

* cited by examiner

*Primary Examiner*—Mike Stahl
(74) *Attorney, Agent, or Firm*—Morgan Lewis & Bockius LLP (57) ABSTRACT

A liquid crystal display (LCD) device having a heat releasing structure is disclosed to effectively release heat generated from heating elements such as an inverter IC and a transformer formed on an inverter PCB (Printed, Circuit Board). The LCD device includes a lower cover; a backlight unit formed on the lower cover and providing light; a liquid crystal panel separated from the backlight unit and provided with light; an inverter PCB that drives the backlight unit; an inverter IC and a transformer mounted on the PCB and generating voltage supplied to the backlight unit; a heat conduction unit attached on the inverter IC and the transformer and heat-conducted; and a shield cover protecting the PCB from the exterior and contacting with the heat conduction unit on the inverter IC and the transformer to release heat.

9 Claims, 6 Drawing Sheets

LIQUID CRYSTAL DISPLAY DEVICE INCLUDING HEAT CONDUCTING PADS BETWEEN SHIELD COVER AND INVERTER IC AND TRANSFORMER

BACKGROUND OF THE INVENTION

1. Field of the Invention

The present invention relates to a liquid crystal display (LCD) device and, more particularly, to an LCD having a heat releasing structure for effectively releasing heat generated from heating elements such as an inverter IC (Integrated Circuit) and a transformer configured on a PCB (Printed Circuit Board).

2. Description of the Related Art

In general, an LCD is a device in which an optical anisotropy is changed by applying an electric field to liquid crystal assuming fluidity of liquid and crystalline optical properties. Compared with the conventional cathode ray tubes (CRTs), the LCD has low power consumption, a small volume, can be increased in size, and has high image resolution (minuteness or fineness).

However, the LCD is a light receiving device that displays images by adjusting the quantity of light received from the exterior, so it needs a light source, namely, a backlight unit, for emitting light to a liquid crystal panel. The backlight unit is divided into an edge type backlight unit and a direct type backlight unit depending on an installation position of a lamp.

Here, the edge type backlight unit includes a lamp installed at the side of a light guide plate that guides light. A lamp unit includes a lamp that emits light, a lamp holder inserted at both ends of the lamp to protect the lamp, and a lamp housing that covers an outer surface of the lamp and fixes the side of the light guide plate at one side surface thereof in order to reflect light emitted from the lamp toward the light guide plate.

The edge type backlight unit is commonly employed for relatively small LCD devices such as monitors of notebook computers and desktop computers, and has good light uniformity and long durability and is advantageous for making the LCD devices thinner.

The direct type backlight unit has been concentratively developed as the size of the LCDs has been increased. A plurality of lamps are arranged in a row on a lower surface of a diffusion plate and directly emit light to a front surface of a liquid crystal panel. The direct type backlight unit has a high light usage efficiency compared with the edge type backlight unit, so it is mainly used for a large-screen LCD that requires a high luminance.

The direct type backlight unit is divided into a light emitting part and a wave guiding part. The wave guiding part is an optical component system that changes light emitted from a light emitting lamp to a uniform surface light source, including a reflective plate, a diffusion plate and a prism sheet. The light emitting part includes the light emitting lamp, an inverter that supplies power to light emitting lamp, and a shield cover that protects the inverter.

Figure 1:
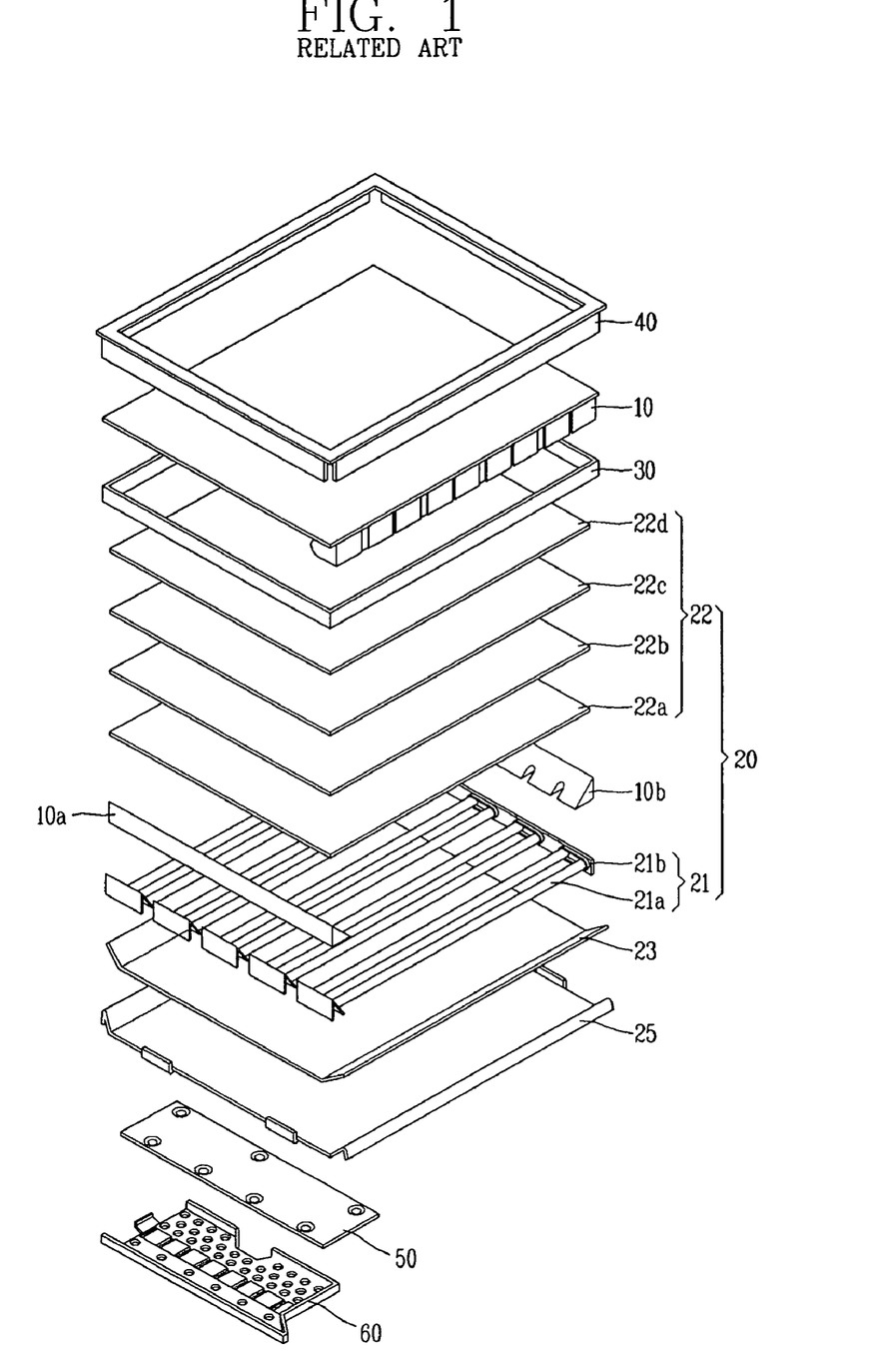
FIG. 1 is an exploded perspective view of a general direct type liquid crystal display (LCD)

FIG. 1 is an exploded perspective view of a general direct type LCD.

As shown in FIG. 1, the LCD includes a direct type backlight unit 20 that provides light to a liquid crystal panel 10 that displays a screen image.

The liquid crystal panel 10 includes a TFT substrate, a color filter substrate, and liquid crystal injected between the two substrates. Also, the liquid crystal panel 10 includes a data PCB, a gate PCB, a TCP (Tape Carrier Package) of a data side, and a TCP of a gate side.

The backlight unit 20 includes a lamp unit 21 that generates first light, a reflective plate 23 that reflects the first light generated from the lamp unit 21, and a light adjusting unit 22 that diffuses the first light to output second light having a uniform luminance distribution.

The lamp unit 21 includes one or more lamps 212a, lamp holders 21b installed at both end portions facing the one or more lamps 21a, and an inverter that supplies power to the lamp unit 21. An inverter PCB 50 having an inverter circuit is covered by a shield cover 60 and fastened to a rear surface of a lower cover 25.

The light adjusting unit 22 includes a diffusion plate 22a, and a first diffusion sheet 22b, a prism sheet 22c, a second diffusion sheet 22d, etc. which are sequentially disposed at an upper side of the diffusion plate 22a.

A main support is formed at an upper portion of the backlight unit 20 and at a lower portion of the liquid crystal panel 40, maintaining the balance of overall power of the LCD.

The upper cover 40 surrounds the edges of four sides of the liquid crystal panel and is fastened to the lower cover 25 to accommodate the liquid crystal panel 10 and the backlight unit 20.

Figure 2:
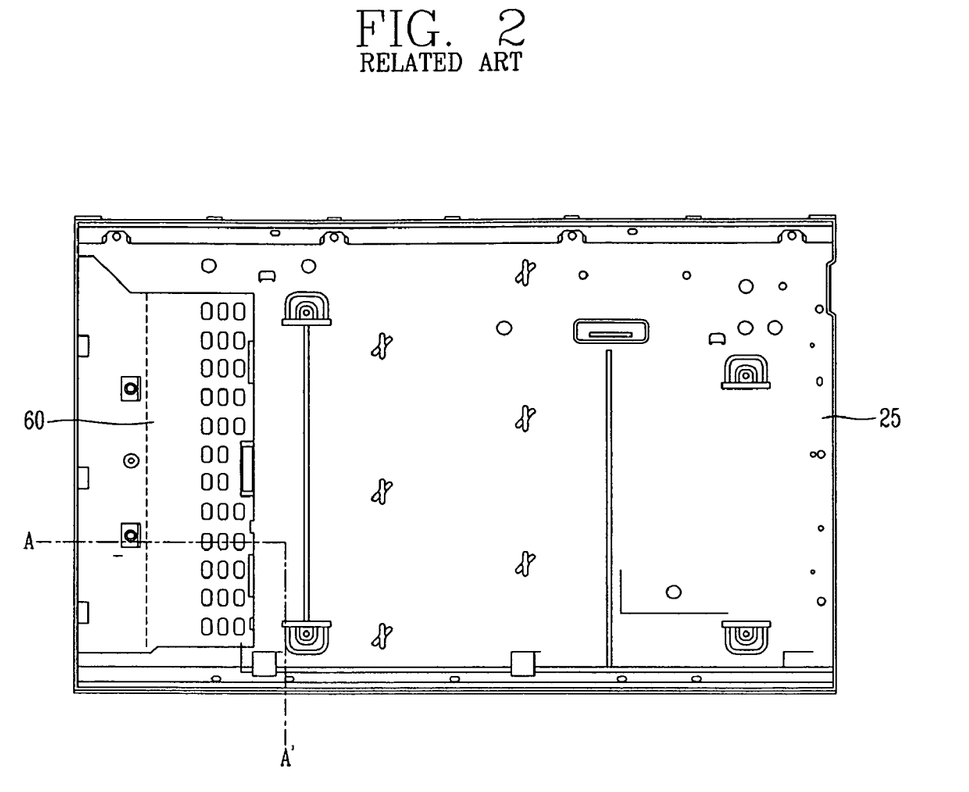
FIG. 2 is a view showing a state that an inverter PCB and a shield cover are fastened to a lower surface of the lower cover.
Figure 3:
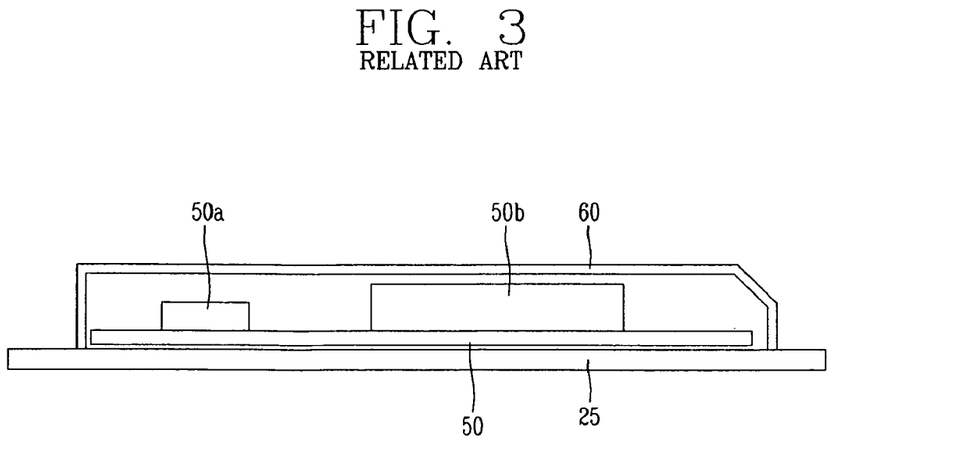
FIG. 3 is a sectional view taken along line A-A' in FIG. 2.

FIG. 2 is a view showing a state that the inverter PCB and the shield cover are fastened to the lower surface of the lower cover, and FIG. 3 is a sectional view taken along line A-A' in FIG. 2.

As shown in FIGS. 2 and 3, the inverter PCB 50 is disposed at one edge portion of the rear surface of the lower cover 25, and includes an inverter IC (Integrated Circuit) 50a including an integrated element such as an FET, etc., and a transformer 50b.

The shield cover 60 is positioned at an upper portion of the inverter PCB 50 to protect the inverter PCB 50 against external static electricity and includes a plurality of holes formed on its surface to externally release heat generated from the lower inverter PCB 50.

Recently, as the LCD is increasingly enlarged, it uses more backlights employing a high output transformer for voltage transformation, and in this case, a large amount of magnetic flux is induced to the shield cover 60 to cause eddy current, which results in that the system generates heat of high temperature and much power consumption.

SUMMARY OF THE INVENTION

Therefore, in order to address the above matters the various features described herein have been conceived. One aspect of the exemplary embodiments is to provide a liquid crystal display having a heat releasing structure in which a heat conduction unit is formed on a heating element such as a transformer or an inverter IC formed on an inverter PCB and allowed to contact with a shield cover to thus effectively release heat.

This specification provides an LCD including: a lower cover; a backlight unit formed on the lower cover and providing light; a liquid crystal panel separated from the backlight unit and provided with light; an inverter PCB that drives the backlight unit; an inverter IC and a transformer mounted on the PCB and generating voltage supplied to the backlight unit; a heat conduction unit attached on the inverter IC and the transformer and heat-conducted; and a shield cover protecting the PCB from the exterior and contacting with the heat conduction unit on the inverter IC and the transformer to release heat.

This specification also provides an LCD including: a lower cover; a backlight unit formed on the lower cover and providing light; a liquid crystal panel separated from the backlight unit and provided with light; an inverter PCB that drives the backlight unit; an inverter IC and a transformer mounted on the PCB and generating voltage supplied to the backlight unit; a heat conduction unit attached at an upper portion of the inverter IC and at a certain region of an upper portion of a primary voltage side of the transformer and heat-conducted; and a shield cover protecting the PCB against the exterior, contacting with the heat conduction unit on the inverter IC and the transformer to release heat, and having a hole to correspond to a certain region of an upper portion of a secondary voltage side of the transformer.

The foregoing and other objects, features, aspects and advantages of the present invention will become more apparent from the following detailed description of the present invention when taken in conjunction with the accompanying drawings.

DETAILED DESCRIPTION OF THE INVENTION

A liquid crystal display (LCD) according to exemplary embodiments of the present invention will now be described.

Figure 4:
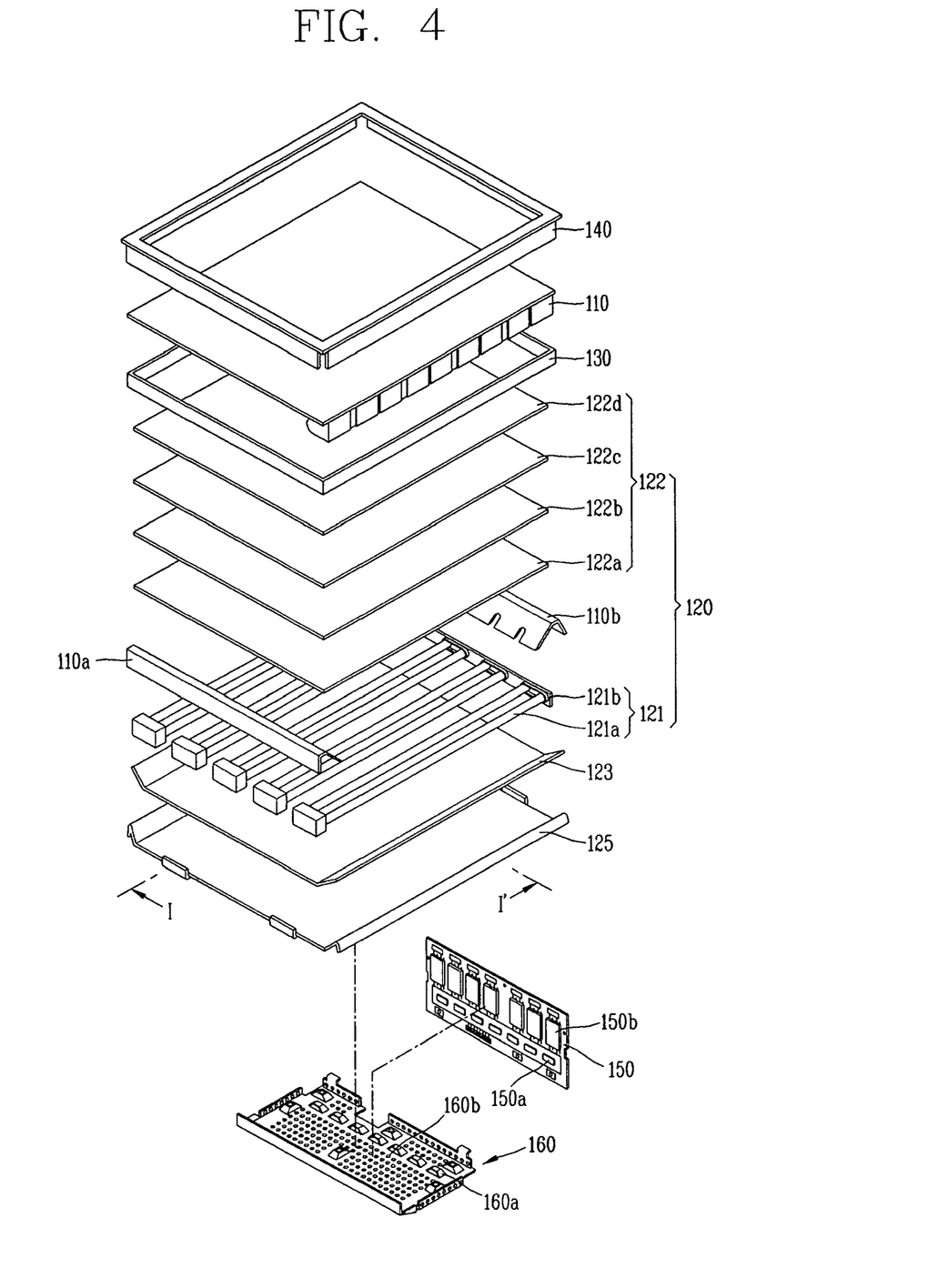
FIG. 4 is an exploded perspective view of an LCD according to one exemplary embodiment of the present invention.
Figure 5:
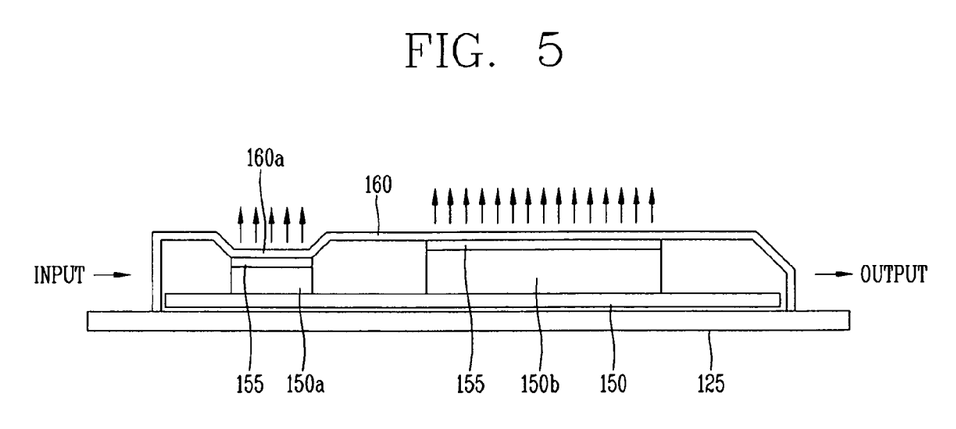
FIG. 5 is a sectional view taken along line I-I' in FIG. 4.

FIG. 4 is an exploded perspective view of an LCD according to one exemplary embodiment of the present invention, and FIG. 5 is a sectional view taken along line I-I' after the inverter PCB 150 and the shield cover 160 are fastened on the lower cover 125 in FIG. 4.

As shown in FIG. 4, a reflective plate 123 for reflecting light from a plurality of lamps 121a, a light source, to a front side is attached on a lower cover 125 made of aluminum (Al), etc. The reflective plate 123 is made of white polyester film or a film coated with a metal (Ag, Al), etc. Light reflectivity of visible light by the reflective plate 123 is about 90% to 97%, and as the coated film becomes thicker, the reflectivity is increased.

A lamp unit 121 including lamp holders 121 that fix a plurality of arranged lamps 121a is provided on the lower cover 125 with the reflective plate 123 attached thereon. A single lamp holder 121 is used to protect a soldered portion of two lamps 121a as a basic unit.

In case of large-scale LCD TVs, it is known that substantially sixteen lamps are used to be arranged at certain intervals for a 32-inch LCD TV, and substantially twenty lamps are used to be arranged at certain intervals for a 40-inch LCD TV, to achieve high luminance.

Side supports 110a and 110b are provided to have the lamp holders 121b of the lamp unit 121 provided on the lower cover 125 therein.

On the side supports 110a and 110b provided at both sides of the lower cover 125, there are formed a diffusion plate 122a that uniformly distributes light directly provided from the lamps 121a or reflected from the reflective plate 123 to the front surface and optical sheets 122b, 122c and 122d that handle other optical supplementary functions.

When the configuration of a backlight unit 120 is completed, a main support 130 is fastened to an upper portion of the backlight unit 120 to maintain the balance of overall power in the LCD. In this case, the main support 130 includes a step pattern on its upper surface in consideration of a liquid crystal panel 110 to be mounted thereon.

The liquid crystal panel 110 is mounted on the main support 130. The liquid crystal panel 110 includes an array substrate on which a thin film transistor (TFTs) is formed as a switching element at each unit pixel, a color filter substrate on which color filters for expressing color are formed, and liquid crystal injected between the two substrates.

The upper cover 140 is fastened to the lower cover 125 by covering the edges of four sides of the liquid crystal panel 110 and the sides of the main support 130.

In order to drive the backlight unit 120, an inverter PCB 150 having inverter circuits such as an inverter IC 150a, a transformer 150b, etc., is fastened to a rear surface of the lower cover 125.

Here, the inverter IC 150a, which is formed by integrating an element such as an FET (Field Effect Transistor), etc., includes a DC/DC converter such as a feedback control circuit that receives DC power from the exterior and converts the same into a DC output voltage to stabilize it, and a switching circuit of a full-bridge type that receives an output voltage from the DC/DC converter and transfers power to the transformer.

The transformer 150b receives a DC voltage from the switching circuit, transforms it into an AC voltage and simultaneously increases the voltage, and drives the lamps 121a by supplying power thereto.

When the lamps 121 are driven, the inverter IC 150a and the transformer 150b formed on the inverter PCB 150 generate a large amount of heat.

Thus, as shown in FIG. 5, heat conduction members 155 having the same size as the area of the inverter IC 150a and the transformer 150b are formed on the inverter IC 150a and the transformer 150b. The heat conduction members 155 absorb heat from the inverter IC 150a and the transformer 150b on the inverter PCB 150 and transfer the heat to a shield cover 160.

Preferably, the heat conduction members 155 are made as a pad material having relatively good temperature characteristics fabricated by mixing silicon (Si) and aluminum oxide ($Al_2O_3$).

As the heat conduction members 155, 9880FR-5F™ of 3M may be properly used. 9880FR-5F™ is fabricated by disorderly dispersing (distributing) heat conductive ceramic particles in a pressure sensitive adhesive tape. As soon as the 9880FR-5F™ is bonded, heat conduction is made through the ceramic particles. In addition, the 9880FR-5F™ is excellent dielectric, has high adhesive strength, and can be re-worked (re-operated).

The shield cover 160 is fastened on the inverter PCB 150 with the heat conduction members 155 attached thereon such that is contacts with the inverter IC 150a and the transformer 150b on the inverter PCB 150.

For example, it is assumed that the transformer 150b on the inverter PCB 150 is formed to be higher than the inverter IC 150a in terms of component structure. In this case, the overall average height of the shield cover 160 would be set on the basis of the height of the transformer 150b, and in order to allow the shield cover 160 to contact with the inverter IC 150a, a bending process should be additionally performed in fabricating the shield cover 160.

As shown, a protrusion 160a formed at an inner surface of the shield cover 160 contacts with the inverter IC 150a on the inverter PCB 150, and the transformer 150b contacts with a bottom surface 160b of the shield cover 160.

As shown in FIG. 5, the inverter PCB 150 is fastened on the rear surface of the lower cover 125, and the heat conduction members 155 are attached on the inverter IC 150a and the transformer 150b formed on the inverter PCB 150.

Here, the transformer 150b is a shielding transformer that prevents magnetic flux from being induced to the shield cover 160. Although not shown, an upper surface of the transformer 150b is covered by a shielding unit of a ferromagnetic substance (Ni—Zn).

However, the shielding unit is not limited thereto, and the transformer can be shielded by a non-magnetic metal of a paramagnetic substance or a diamagnetic substance.

Here, the paramagnetic substance refers to a material which is magnetized weakly in a direction of a magnetic field when put into a magnetic field. When the magnetic field is removed, the paramagnetic substance is not magnetized. The paramagnetic substance includes aluminum, tin, platinum, iridium, etc. The diamagnetic substance refers to a material which is magnetized in the opposite direction of the magnetic field by an external magnetic field, including materials excluding metals such as gold, silver, copper, etc.

Thus, in consideration of a situation that the shield cover 160 that protects the lower cover 125 and the inverter of the LCD is replaced by EGI, the shielding unit can serve to quickly absorb heat generated from the transformer 150b and release it outwardly, as well as minimizing the influence by the ferromagnetic substance provided at an ambient portion on the transformer 150b.

The shield cover 160 is fastened in contact with the inverter IC 150a and the transformer 150b with the heat conduction members 155 formed thereon.

Thus, because the shield cover 160 and the transformer 150b contact directly via the heat conduction members 155, a thermal resistance value can be minimized. This means that the heat release characteristics can be increased by maximizing the heat transfer.

Figure 6:
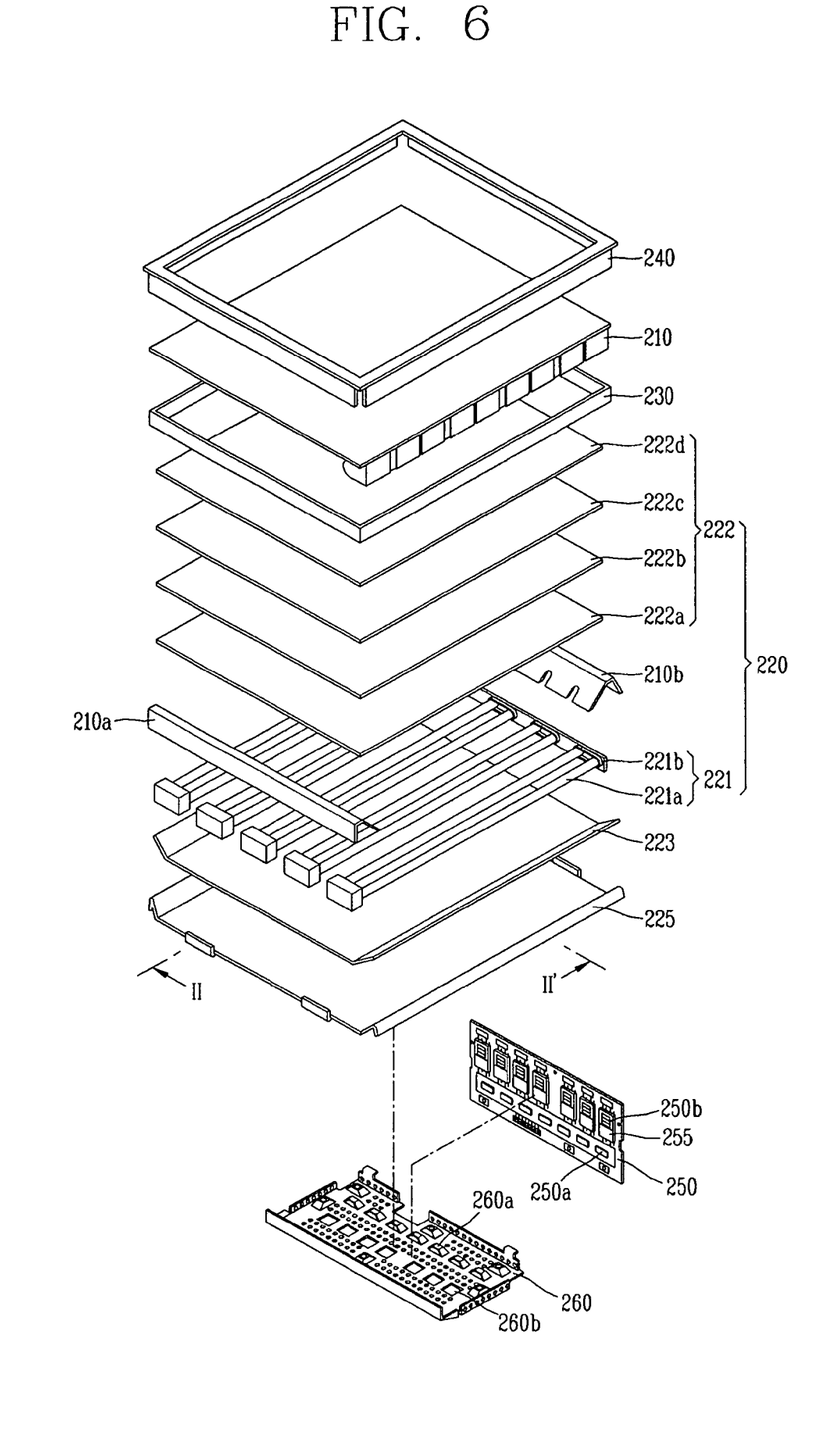
FIG. 6 is an exploded perspective view of an LCD according to another exemplary embodiment of the present invention.
Figure 7:
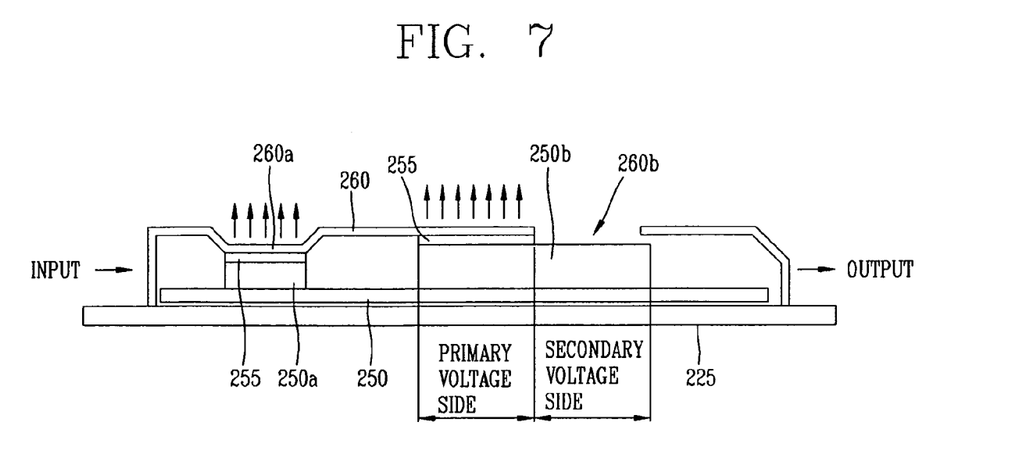
FIG. 7 is a sectional view taken along line II-II' in FIG. 6.

FIG. 6 is an exploded perspective view of an LCD according to another exemplary embodiment of the present invention, and FIG. 7 is a sectional view taken along line II-II' in FIG. 6.

With reference to FIGS. 6 and 7, a heat conduction member 255 is formed with certain regions at an upper portion of an inverter IC 250Aa and at an upper portion of a primary voltage side of a transformer 250b on an inverter PCB.

Here, the transformer 250b, which is a non-shielding transformer, does not has a shielding unit on its upper end portion, so a secondary high voltage part of the transformer 250b and the shield cover 260 cannot contact directly with each other in terms of safety standards.

If a heat conduction member was formed on the secondary high voltage part of the non-shielding transformer 250b and the shielding cover 260 contacted therewith, a short phenomenon would occur between the shield cover 260 and the transformer 250b.

Thus, in the present invention, preferably, a hole 260b in a square (or rectangular) shape is formed to correspond to a certain region at an upper portion of a secondary voltage side of the transformer 250b.

For example, the region of the transformer 250b is divided into two exact halves, one half being the primary voltage side and the other half being the secondary voltage side of the transformer 250b, and the heat conduction member 255 and the shield cover 260 contacting with the heat conduction member 255 are formed on the primary voltage side transformer 250b to release heat outwardly. Meanwhile, the shield cover 260 with the hole 260b is positioned on the secondary voltage side transformer 250b, and the secondary voltage side of the transformer 250b is exposed to release heat outwardly.

Excluding the above-described content, the LCD according to another exemplary embodiment of the present invention is not much different from that of one exemplary embodiment of the present invention, so other detailed content will be replaced by the above-described content.

As so far described, the LCD according to the present invention has such advantages that because heat generated from heating elements on the inverter PCB can be quickly released outwardly, power consumption at the inverter PCB can be reduced and the efficiency of an input voltage to an output voltage can be increased.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
a lower cover;
a backlight unit being had on the lower cover and providing light;
a liquid crystal panel being separated from the backlight unit and being provided with light;
an inverter PCB that drives the backlight unit;
an inverter IC and a transformer being had on the PCB and generating voltage being supplied to the backlight unit;
a heat conduction member being attached on the inverter IC and the transformer and transmitting the heat from the inverter IC and the transformer;
a shield cover protecting the PCB against the exterior and contacting with the heat conduction member on the inverter IC and the transformer to release heat; and
protrusion formed at the shield cover to contact the upper surface at least at one of the inverter IC and the transformer through the heat conduction member.

2. The device of claim 1, wherein the transformer is a shielding transformer that prevents magnetic field from spreading to outside.

3. The device of claim 1, wherein the heat conduction member is a temperature pad made by mixing silicon (Si) and aluminum oxide ($Al_2O_3$).

4. A liquid crystal display device comprising:
a lower cover;
a backlight unit being formed on the lower cover and providing light;
a liquid crystal panel being separated from the backlight unit and being provided with light;
an inverter PCB that drives the backlight unit;
an inverter IC and a transformer being mounted on the PCB and generating voltage being supplied to the backlight unit;
a heat conduction member being attached at an upper portion of the inverter IC and at some regions of an upper portion of a primary voltage side of the transformer, and transmitting the heat from the inverter IC and the transformer; and a shield cover protecting the PCB from the exterior, contacting with the heat conduction member on the inverter IC and the transformer to release heat, and having a hole to correspond to some regions of an upper portion of a secondary voltage side of the transformer.

5. The device of claim 4, wherein the transformer is a non-shielding transformer.

6. The device of claim 4, wherein the heat conduction member is a temperature pad made by mixing silicon (Si) and aluminum oxide ($Al_2O_3$).

7. The device of claim 4, wherein when the inverter IC and the transformer are formed with different heights on the inverter PCB, the shield cover contacting with the heat conduction member has also differences of a step.

8. The device of claim 4, wherein the some regions of the upper portion of the primary voltage side of the transformer correspond to a half of the area of the upper portion of the transformer.

9. The device of claim 4, wherein the some regions of the upper portion of the secondary voltage side of the transformer correspond to a half of the area of the upper portion of the transformer.

* * * * *